United States Patent
Febvre et al.

(10) Patent No.: US 7,519,370 B2
(45) Date of Patent: Apr. 14, 2009

(54) METHOD AND APPARATUS FOR CONTROLLING TRANSMISSIONS IN COMMUNICATIONS SYSTEMS

(75) Inventors: Paul Febvre, Suffolk (GB); David Denis Mudge, London (GB)

(73) Assignee: Inmarsat Global Limited, London (GB)

( * ) Notice: Subject to any disclaimer, the term of this patent is extended or adjusted under 35 U.S.C. 154(b) by 215 days.

(21) Appl. No.: 10/798,604

(22) Filed: Mar. 12, 2004
(Under 37 CFR 1.47)

(65) Prior Publication Data

US 2005/0026621 A1    Feb. 3, 2005

Related U.S. Application Data

(62) Division of application No. 09/440,468, filed on Nov. 15, 1999, now abandoned.

(30) Foreign Application Priority Data

Mar. 5, 1999    (GB)  ................................. 9905181.5

(51) Int. Cl.
*H04Q 7/20*    (2006.01)
(52) U.S. Cl. ........................ 455/450; 370/436; 370/441; 370/442; 370/461; 370/447
(58) Field of Classification Search ................ 455/3.02, 455/427, 12.1, 13.2, 450, 451, 464, 408, 455/512; 370/314, 447, 458, 252, 443, 448, 370/462, 461
See application file for complete search history.

(56) References Cited

U.S. PATENT DOCUMENTS 5,222,249 A    6/1993    Carney (Continued)

FOREIGN PATENT DOCUMENTS

DE    44 32 926 A1    3/1996

(Continued)

OTHER PUBLICATIONS

Asker, J.R., "INMARSAT-3: The New Stars of Mobile Satellite Communication," *TRANSAT*, Issue 36, Jan. 1996, pp. 15-18.

(Continued)

*Primary Examiner*—Tu X Nguyen
(74) *Attorney, Agent, or Firm*—Sterne, Kessler, Goldstein & Fox PLLC

(57) ABSTRACT

In a bandwidth allocation protocol for a mobile communications network, mobile terminals report their bandwidth requirements to the network, while the network controls the amount of bandwidth that is used by the mobiles in reporting their bandwidth requirements. The mobiles indicate the total quantity of data awaiting transmission, the maximum delay time of the most urgent portion of the data and the maximum delay time of the least urgent portion. If a collision occurs between transmission by two mobiles, the mobiles wait for an interval controlled by the network before attempting another contention-based access transmission. The network periodically varies the contention-based access capacity available according to the observed usage level and/or collision rate in the previously allocated contention-based access capacity. The network analyses the forward traffic to individual mobiles and predicts the return bandwidth requirements which are likely to result from the forward traffic. The network stores associations between forward and return frequency channels, so that when a mobile receiving a forward frequency channel request return capacity, the network preferentially assigns return bandwidth to the mobile in one or more of the associated return channels.

4 Claims, 10 Drawing Sheets

U.S. PATENT DOCUMENTS

| | | | |
|---|---|---|---|
| 5,363,374 A | 11/1994 | Zein Al Abedeen et al. | |
| 5,608,721 A | 3/1997 | Natarajan et al. | |
| 5,684,802 A | 11/1997 | Perreault et al. | |
| 5,699,355 A | 12/1997 | Natarajan | |
| 5,771,459 A | 6/1998 | Demery et al. | 455/517 |
| 5,790,939 A | 8/1998 | Malcolm et al. | 455/13.2 |
| 6,023,606 A * | 2/2000 | Monte et al. | 455/13.1 |
| 6,078,572 A | 6/2000 | Tanno et al. | |
| 6,327,254 B1 | 12/2001 | Chuan | |
| 6,370,153 B1 * | 4/2002 | Eng | 370/438 |
| 6,430,172 B1 | 8/2002 | Usui et al. | |
| 6,522,635 B1 * | 2/2003 | Bedwell | 370/314 |
| 6,674,765 B1 * | 1/2004 | Chuah et al. | 370/458 |

FOREIGN PATENT DOCUMENTS

| | | |
|---|---|---|
| EP | 0 535 762 A1 | 4/1993 |
| EP | 0 719 062 A2 | 6/1996 |
| EP | 0 722 228 A2 | 7/1996 |
| EP | 0 748 061 A2 | 12/1996 |
| EP | 0 748 061 A3 | 12/1996 |
| GB | 2 095 516 A | 9/1982 |
| GB | 2 259 387 A | 3/1993 |
| GB | 2 270 815 A | 3/1994 |
| GB | 2 277 232 A | 10/1994 |
| GB | 2 290 924 A | 1/1996 |
| GB | 2 301 734 | 11/1996 |
| GB | 2 319 699 A | 5/1998 |
| GB | 2 320 162 A | 6/1998 |
| GB | 2 343 594 A | 5/2000 |
| WO | WO 89/11126 | 11/1989 |
| WO | WO 94/21063 | 9/1994 |
| WO | WO 98/21834 | 5/1998 |
| WO | WO 98/25358 | 6/1998 |
| WO | WO 99/34521 | 7/1999 |

OTHER PUBLICATIONS

Partial European Search Report issued Oct. 10, 2002 for Appln. No. EP 99 30 9029, 1 page.

European Search Report for Appln. No. EP 99 30 9029, Jan. 13, 2003 (date of completion of search), 7 pages.

Japanese Patent Abstract entitled "Radio Packet Communication System;" for JP 1042951 (Feb. 1989).

* cited by examiner (a) LESP RECEIVER MR
(b) MESP TRANSMITTER MT

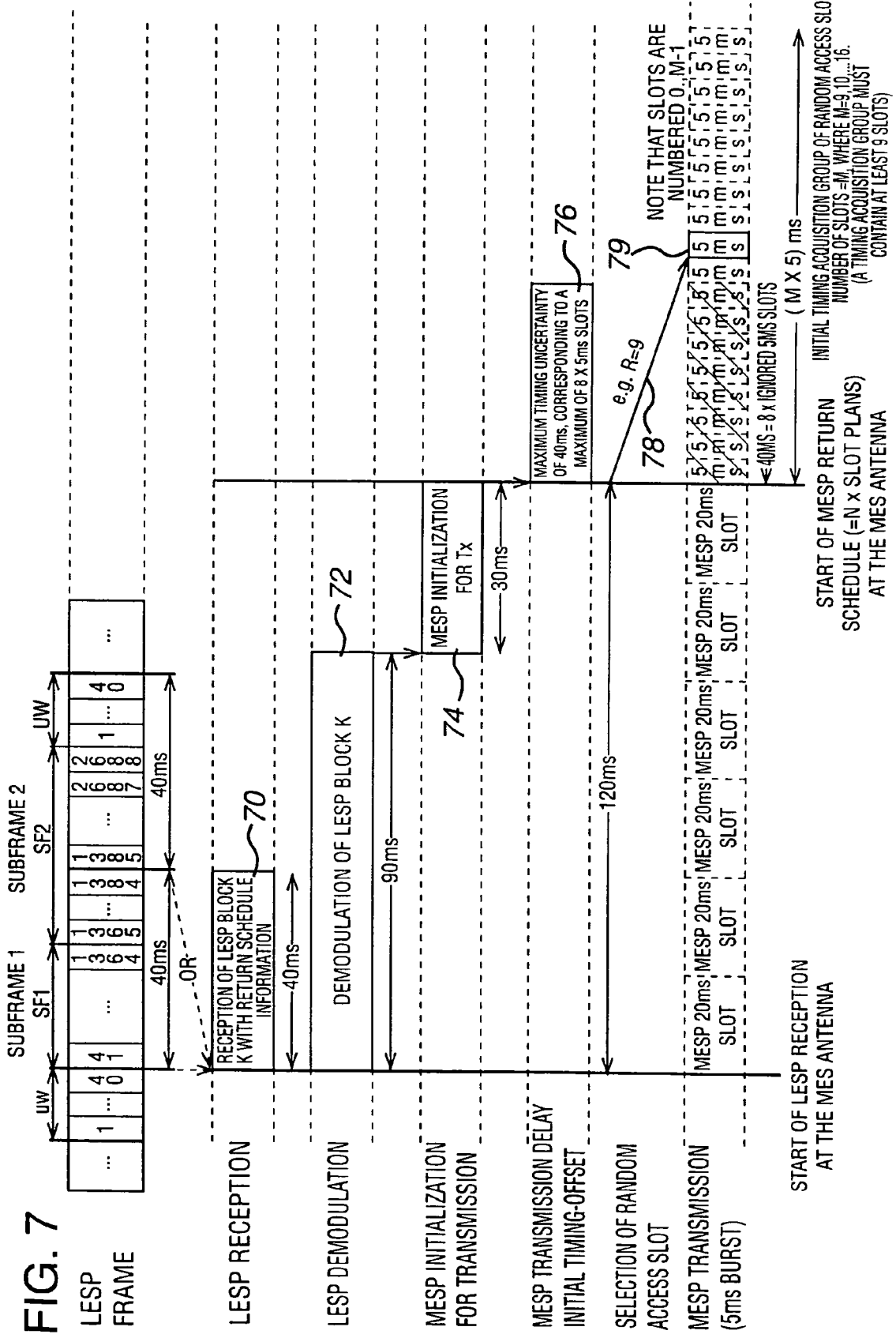

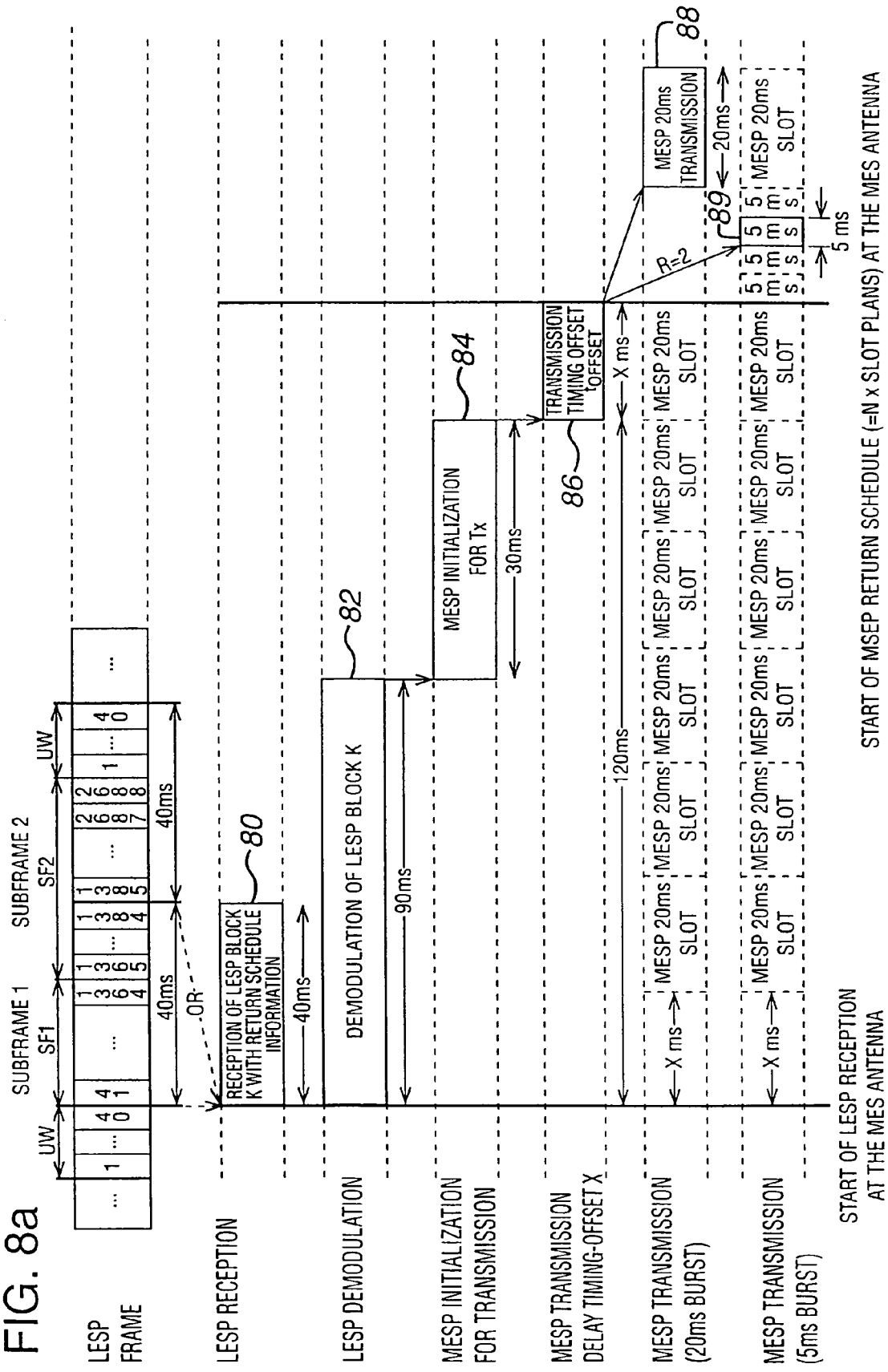

METHOD AND APPARATUS FOR CONTROLLING TRANSMISSIONS IN COMMUNICATIONS SYSTEMS

CROSS REFERENCE TO RELATED APPLICATION

This application is a divisional of application Ser. No. 09/440,468, filed on Nov. 15, 1999, which is incorporated herein by reference in its entirety.

The present invention relates to communications apparatus and methods, particularly but not exclusively for wireless communications, particularly but not exclusively via satellite.

A number of wireless communications systems have already been proposed to support shared access by many simultaneous communications sessions of different types. For example, the patent publication WO 98/25358 discloses a mobile satellite communications system which supports the variable bandwidth requirements of multiple simultaneous communications sessions.

With this type of system, it is difficult to allocate bandwidth to meet the varying requirements of multiple terminals or sessions, while using the overall bandwidth efficiently. The bandwidth allocation protocols themselves incur a significant signalling overhead, but the more information that is exchanged in these protocols, the better the network is able to adapt to constantly changing demands for bandwidth. Some bandwidth may be designated as being available for contention-based access, which allows data and signalling to be transmitted by mobiles without a bandwidth allocation specific to that mobile, but contention-based access is very bandwidth-inefficient; if the probability of collision is to be kept low, much more bandwidth needs to be allocated than is likely to be actually used.

According to one aspect of the present invention, there is provided a bandwidth allocation protocol in a mobile communications network in which mobiles report their bandwidth requirements to the network, while the network controls the amount of bandwidth that is used by the mobiles in reporting their bandwidth requirements. In this way, the network can control the signalling overhead used by the bandwidth allocation protocol, so as to make more bandwidth available for user data when a channel becomes congested. Alternatively, when the channel is not congested, the network can allow the mobiles to report changes in their bandwidth requirements more quickly, increasing the likelihood that the quality of service demands by active communications sessions on the mobiles can be met.

According to another aspect of the present invention, there is provided a bandwidth allocation protocol in which mobiles indicate both the quantity of data awaiting transmission and the maximum delay requirements for transmission of that data. Instead of indicating individually the delay requirements of each block of data awaiting transmission, the mobiles indicate the total quantity of data awaiting transmission, the maximum delay time of the most urgent portion of said data and the maximum delay time of the least urgent portion. This provides enough information for the network to allocate the necessary bandwidth at the right time to meet the delay requirements of all of the data, while reducing the amount of information needed to indicate the delay requirements.

According to another aspect of the present invention, there is provided a contention-based access protocol for wireless mobile terminals, in which, if a collision occurs between transmission by two mobiles, the mobiles wait for an interval controlled by the network before attempting another contention-based access transmission. In one example, the network transmits an interval range signal to the mobiles, indicating a range for the interval for which the mobiles must wait before retransmitting, and the mobiles select an interval within the range; preferably, this selection is random or pseudo-random. This protocol allows the network to control the likelihood of collision in contention-based access, without necessarily having to allocate more bandwidth to contention-based access; instead, some of the mobiles may be forced to wait longer before retrying.

A further refinement of this protocol involves the network specifying a further increment by which the mobiles must increase the range of the interval each time a subsequent attempt at transmitting the same burst fails. If there are repeated collisions, this indicates that there is not enough contention-based capacity to meet the current demands of the mobiles. According to this refinement, mobiles experiencing repeated collisions are automatically spread over an increasingly broader range of contention-based access capacity to increase the chance of the burst getting through, while the interval range applied by mobiles waiting after their first unsuccessful transmission is not affected.

According to another aspect of the present invention, there is provided a method of managing contention-based access capacity for mobile terminals in a wireless network, in which the network periodically varies the contention-based access capacity available according to the observed usage level and/or collision rate in the previously allocated contention-based access capacity. This adaptive allocation has the advantage of allowing excess allocation of contention-based access capacity to be avoided, while keeping collision rates at an acceptable level.

According to another aspect of the present invention, there is provided a method of allocating return bandwidth to mobiles in a network, in which the network analyses the forward traffic to individual mobiles and predicts the return bandwidth requirements which are likely to result from the forward traffic. At least two possible analytical approaches may be taken, separately or in combination: interpreting the forward traffic by identifying for example requests to send data or to set up specific types of call, and forming a statistical model relating patterns of forward traffic to patterns of return traffic. This aspect has the advantage that the mobile does not need to request additional bandwidth because the network can detect that it is required and allocate it in advance, thus reducing the signalling overhead and reducing the delay before the required bandwidth becomes available.

According to another aspect of the present invention, there is provided a frequency channel allocation scheme in which a wireless network stores associations between forward and return frequency channels, so that when a mobile receiving a forward frequency channel requests return capacity, the network preferentially assigns return bandwidth to the mobile in one or more of the associated return channels. As a result, mobiles assigned capacity in a particular set of return channels are likely to be tuned to a small number of different forward channels, so that bandwidth allocation schedules for return channels need only be transmitted on a small number of associated forward channels.

Aspects of the present invention extend to apparatus adapted to carry out the above methods and protocols, as well as signals generated by these methods and protocols.

Specific embodiments of the present invention will now be described with reference to the accompanying drawings, in which:

FIG. 7 is a timing diagram illustrating the operation of an initial timing correction protocol for correcting the timing of transmissions in the MESP channels;

FIG. 8a is a timing diagram illustrating the timing of a transmission in one of the MESP channels immediately following a timing correction;

SYSTEM OVERVIEW

Figure 1:
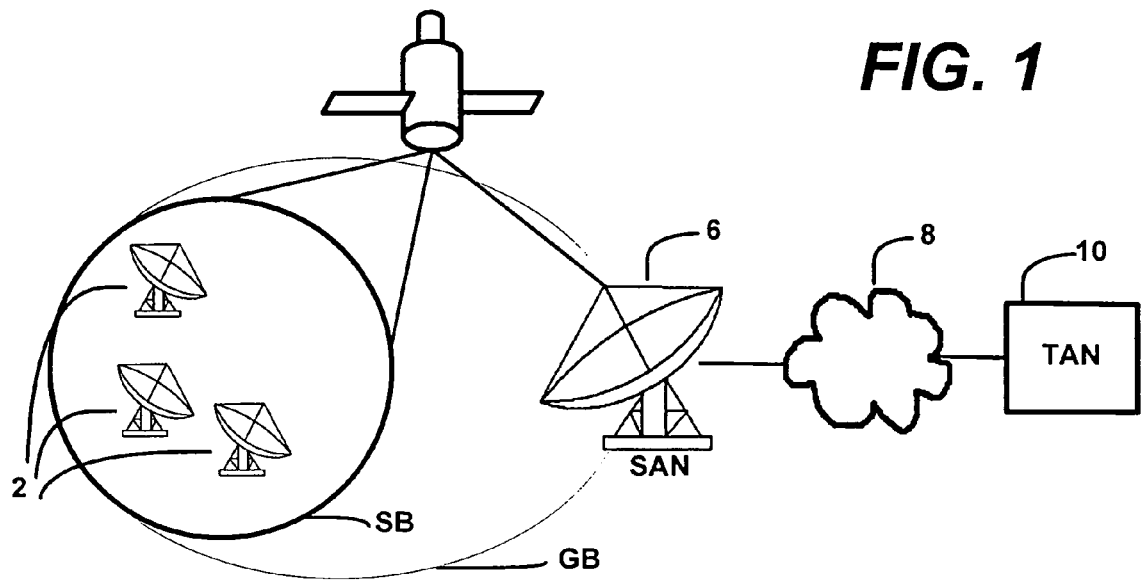
FIG. 1 is a diagram of components of a satellite communication system incorporating embodiments of the present invention.

FIG. 1 shows the principal elements of a satellite communications system in an embodiment of the present invention. A plurality of Mobile Access Nodes (MAN) 2 communicate via a satellite 4 with a satellite earth station, hereinafter referred to as a Satellite Access Node (SAN) 6. The satellite 4 may for example be an Inmarsat-3™ satellite, as described for example in the article 'Launch of a New Generation' by J R Asker, TRANSAT, Issue 36, January 1996, pages 15 to 18, published by Inmarsat, the contents of which are included herein by reference. The satellite 4 is geostationary and projects a plurality of spot beams SB (five spot beams in the case of an Inmarsat-3™ satellite) and a global beam GB, which encompasses the coverage areas of the spot beams SB, on the earth's surface. The MAN's 2 may be portable satellite terminals having manually steerable antennas, of the type currently available for use with the Inmarsat mini-M™ service but with modifications as described hereafter. There may be a plurality of SAN's 6 within the coverage area of each satellite 4 and capable of supporting communications with the MAN's 2 and there may also be further geostationary satellites 4 with coverage areas which may or may not overlap that of the exemplary satellite 4. Each SAN 6 may form part of an Inmarsat Land Earth Station (LES) and share RF antennas and modulation/demodulation equipment with conventional parts of the LES. Each SAN 6 provides an interface between the communications link through the satellite 4 and one or more terrestrial networks 8, so as to connect the MAN's 2 to terrestrial access nodes (TAN) 10, which are connectable directly or indirectly through further networks to any of a number of communications services, such as Internet, PSTN or ISDN-based services.

Channel Types

Figure 2:
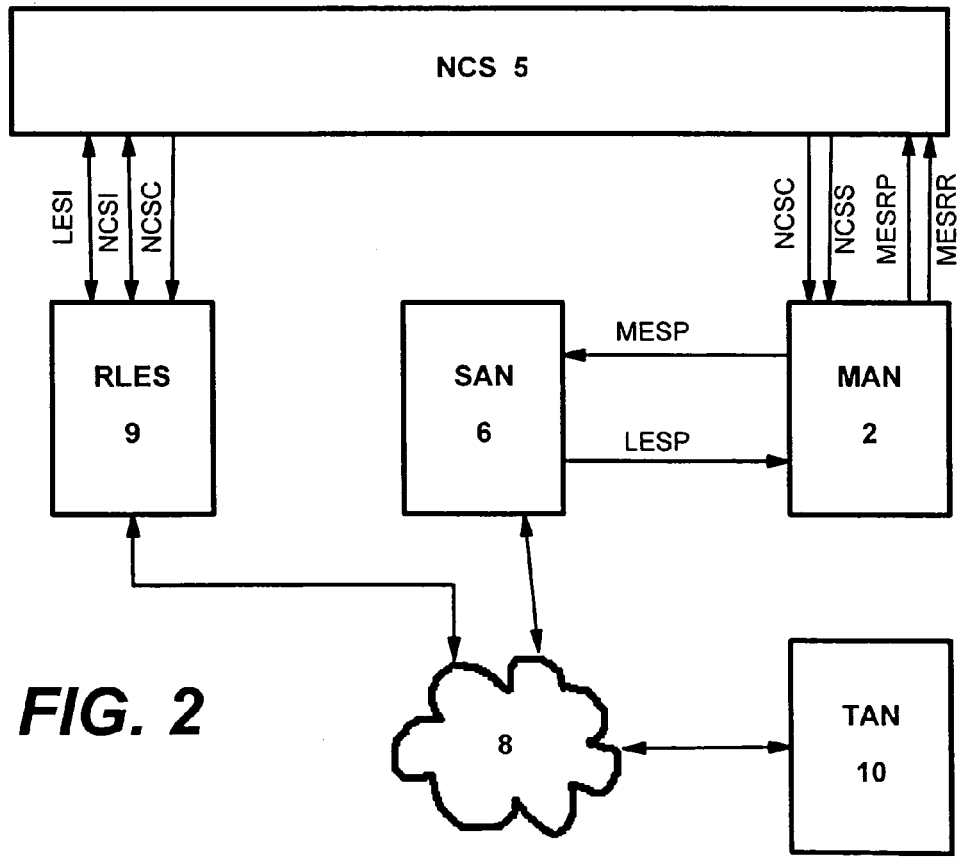
FIG. 2 shows the channels used for communication between the SAN and the MAN's in a packet data service implemented in the system of FIG. 1.

FIG. 2 shows the channels used for communication between a sample one of the MAN's 2 and the SAN 6. All communications under this packet data service from the MAN 2 to the SAN 6 are carried on one or more slots of one or more TDMA channels, referred to as MESP channels (mobile earth station—packet channels). Each MESP channel is divided into 40 ms blocks, divisible into 20 ms blocks. Each 20 ms block carries either one 20 ms burst or four 5 ms bursts, in a format which will be described below.

All communications under this packet data service from the SAN 6 to the MAN 2 are carried on one or more slots of one or more TDM channels, referred to as LESP channels (land earth station—packet channels). The slots are each 80 ms long, and comprise two subframes of equal length.

For the purposes of channel set-up and other network signalling, the MAN 2 also communicates with a network co-ordination station (NCS) 5, as is known in the Inmarsat Mini-M™ service. The SAN 6 communicates through the network 8 to a regional land earth station (RLES) 9 which communicates with the NCS 5 so as to perform channel set-up and other network signalling.

Satellite Link Interface

The satellite link interface between the MAN's 2 and the SAN 6 to which the MAN's 2 are connected will now be described. This interface can be considered as a series of communications layers: a physical layer, a medium access control (MAC) layer and a service connection layer.

SAN Channel Unit

Figure 3:
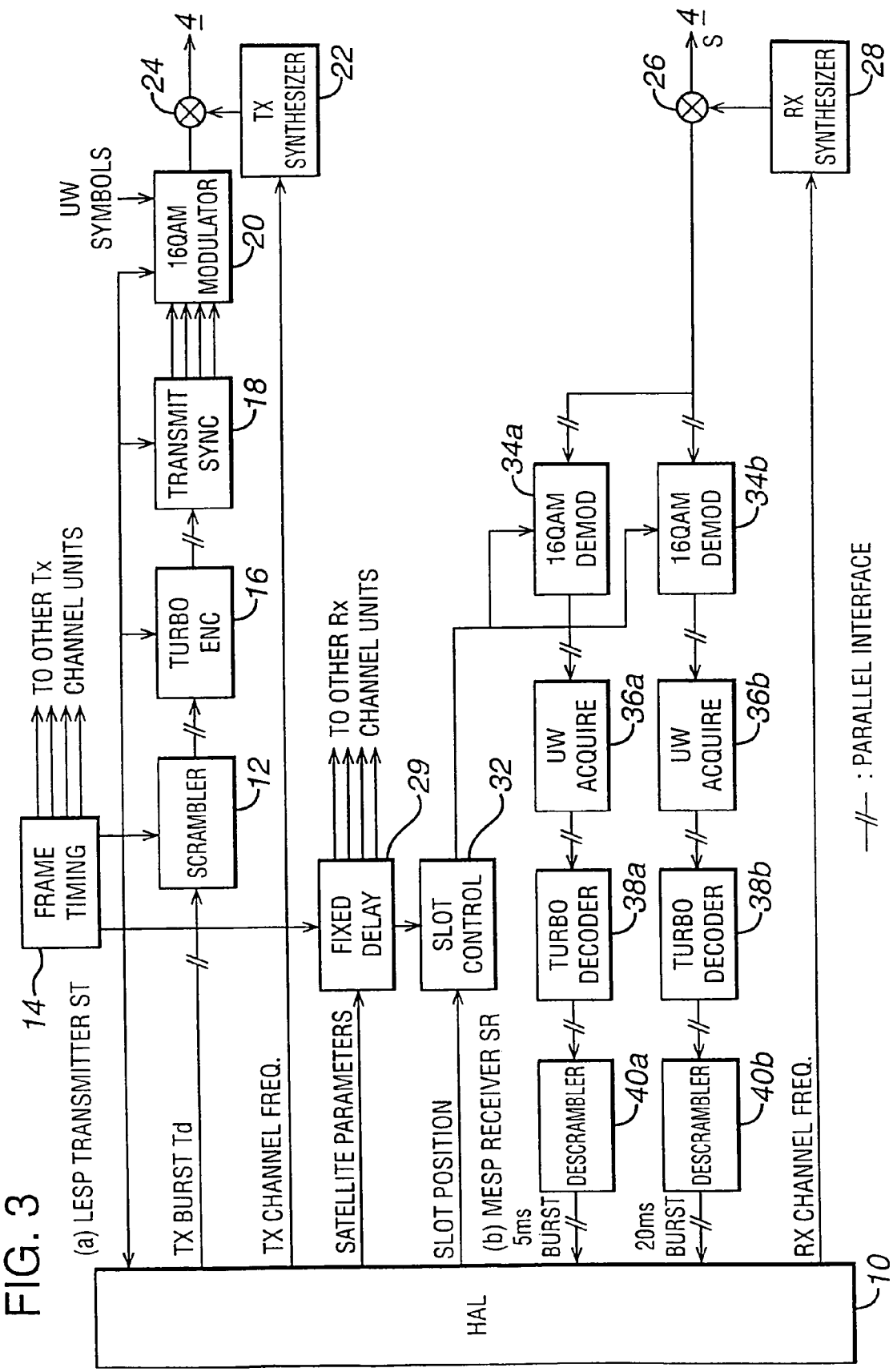
FIG. 3 is a diagram of transmitter and receiver channel units in a satellite access node (SAN) of the system of FIG. 1.

FIG. 3 shows the functions within the SAN 6 of a transmitter channel unit ST, which performs the transmission of data packets over a single frequency channel of the satellite link, and a receiver channel unit SR, which performs the reception of data packets over a single frequency channel of the satellite link. Preferably, the SAN 6 includes multiple transmitter channel units ST and receiver channel units SR so as to be able to provide communications services to a sufficient number of MAN's 2.

A hardware adaptation layer (HAL) 10 provides an interface between the channel units and higher level software, and controls the settings of the channel units. In the transmitter channel unit ST, the HAL 10 outputs data bursts Td which are scrambled by a scrambler 12, the output timing of which is controlled by a frame timing function 14 which also provides frame timing control signals to the other transmitter channel units ST. The scrambled data bursts are then redundancy encoded by an encoder 16, by means for example of a turbo encoding algorithm as described in PCT/GB97/03551.

The data and parity bits are output from the encoder 16 to a transmit synchronising function 18 which outputs the data and parity bits as sets of four bits for modulation by a 16QAM modulator 20. Unique word (UW) symbols are also input to the modulator 20 according to a slot format which is described below. The output timing of the encoder 16, transmit synchroniser 18 and modulator 20 is controlled by the HAL 10, which also selects the frequency of the transmit channel by controlling a transmit frequency synthesiser 22 to output an upconversion frequency signal. This frequency signal is combined with the output of the modulator 20 at an upconverter 24, the output of which is transmitted by an RF antenna (not shown) to the satellite 4.

In the receiver channel unit SR, a frequency channel is received by an RF antenna (not shown) and downconverted by mixing with a downconversion frequency signal at a downconverter 26. The downconversion frequency signal is generated by a reception frequency signal synthesiser 28, the output frequency of which is controlled by the HAL 10.

In order to demodulate the received bursts correctly, the timing of reception of the bursts is predicted by a receive timing controller 29, which receives the frame timing control information from the frame timing function 14 and parameters of the satellite 4 from the HAL 10. These parameters define the position of the satellite 4 and of its beams and allow the timing of arrival of data bursts from the MAN's 2 to the SAN 6 to be predicted. The propagation delay from the SAN 6 to the satellite 4 varies cyclically over a 24 hour period as a result of the inclination of the satellite's orbit. This delay variation is similar for all of the MAN's 2 and is therefore used to modify the reference timing of the MESP channels, so that the timing of the individual MAN's 2 does not need to be modified to compensate for variations in satellite position.

The predicted timing information is output to each of the receive channel units SR. The received bursts are of either 5 ms or 20 ms duration according to a scheme controlled by the SAN 6. The HAL 10 provides information about the expected slot types to a slot controller 32, which also receives information from the receive timing controller 29.

FIG. 3 shows separate reception paths for 5 ms and 20 ms bursts; references to functions on each of these paths will be denoted by the suffixes a and b respectively. The slot controller 32 selects which reception path to use for each received burst according to the predicted length of the burst. The burst is demodulated by a 16QAM demodulator 34a/34b and the timing of the burst is acquired by a UW acquisition stage 36a/36b. Once the start and end of the burst is determined, the burst is turbo-decoded by a decoder 38a/38b and descrambled by a descrambler 40a/40b. The recovered 5 or 20 ms data burst is then received by the HAL 10.

MAN Channel Unit

Figure 4:
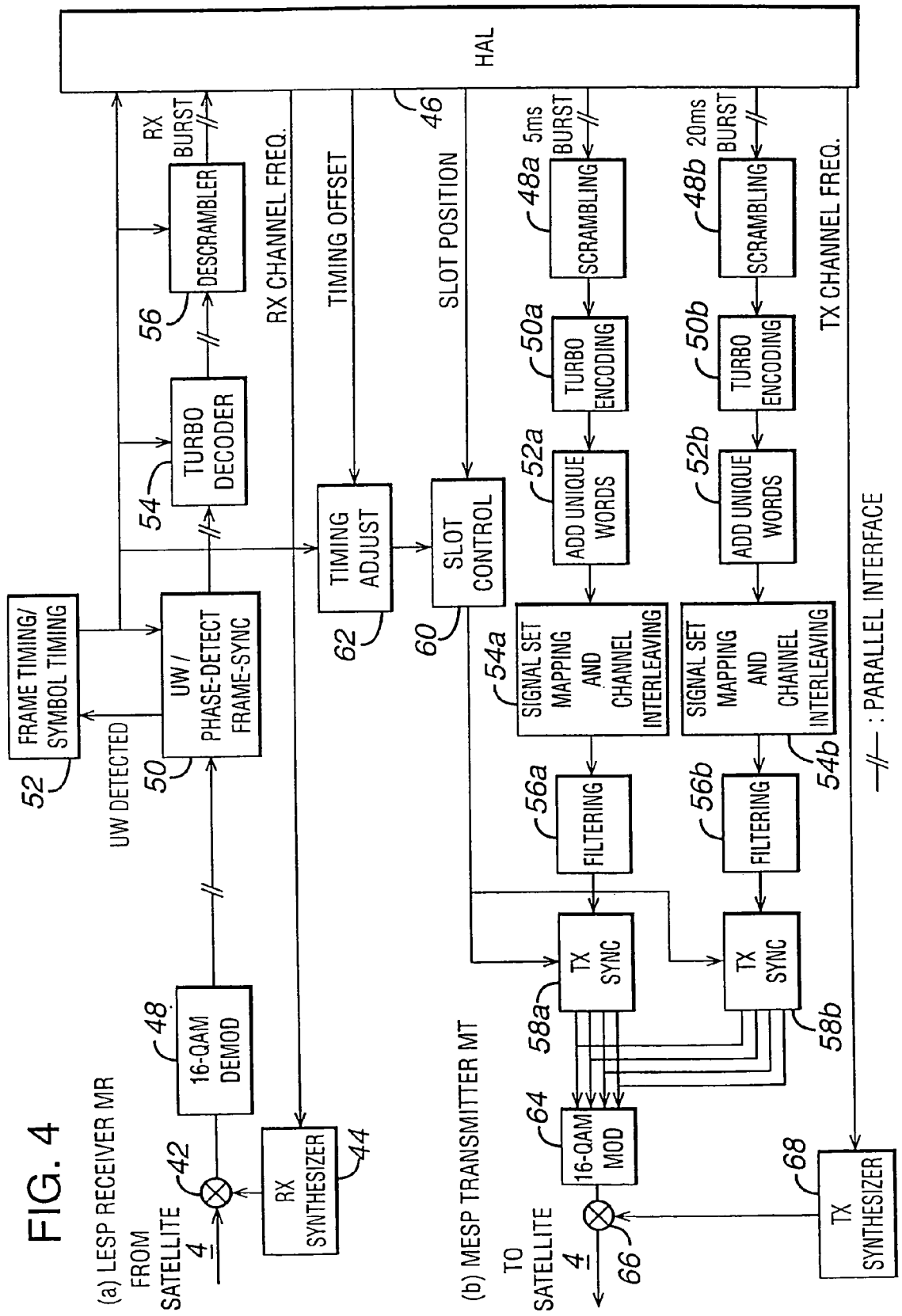
FIG. 4 is a diagram of transmitter and receiver channel units in a Mobile Access Node (MAN) of the system of FIG. 1.

FIG. 4 shows the functions within one of the MAN's 2 of a receiver channel unit MR and a transmitter channel unit MT. The MAN 2 may have only one each of the receiver and transmitter channel unit, for reasons of compactness and cost, but if increased bandwidth capacity is required, multiple receiver and transmitter channel units may be incorporated in the MAN 2.

In the receiver channel unit MR a signal is received by an antenna (not shown) and down-converted by a down-converter 42 which receives a down-conversion frequency signal from a receive frequency signal synthesiser 44, the frequency of which is controlled by an MAN hardware adaptation layer 46. The down-converted signal is demodulated by a 16QAM demodulator 48 which outputs the parallel bit values of each symbol to a UW detection stage 50, where the timing of the received signal is detected by identifying a unique word (UW) in the received signal. The timing information is sent to a frame and symbol timing unit 52 which stores timing information and controls the timing of the later stages of processing of the signal, as shown in FIG. 4. Once the block boundaries of the received data have been detected, the received blocks are turbo decoded by a decoder 54, descrambled by a descrambler 56 and output as received bursts to the HAL 46.

In the transmitter channel unit MT, data for bursts of 5 or 20 ms duration are output from the HAL 46. Separate paths identified by the suffixes a and b are shown in FIG. 4 for the 5 and 20 ms bursts respectively. The data is scrambled by a scrambler 48a/48b and encoded by a turbo encoder 50a/50b. Unique Words (UW) are added as dictated by the burst format at step 52a/52b and the resultant data stream is mapped onto the transmission signal set at step 54a/54b and filtered at step 56a/56b. The transmission timing is controlled at a transmission timing control step 58a/58b. At this step, the TDMA slot position is controlled by a slot control step 60 according to a designated slot position indicated by the HAL 46. A timing offset is output by the HAL 46 and is supplied to a timing adjustment step 62 which adjusts the timing of the slot control step 60. This timing offset is used to compensate for variations in propagation delay caused by the relative position of the MAN 2, the satellite 4 and the SAN 6 and is controlled by a signalling protocol, as will be described in greater detail below. The sets of data bits are output at a time determined according to the slot timing and the timing adjustment to a 16QAM modulator 64. The modulated symbols are upconverted by an upconverter 66 to a transmission channel frequency determined by a frequency output by a transmission frequency synthesiser 68 controlled by the HAL 46. The upconverted signal is transmitted to the satellite 4 by an antenna (not shown).

LESP Channel Format

Figure 5A:
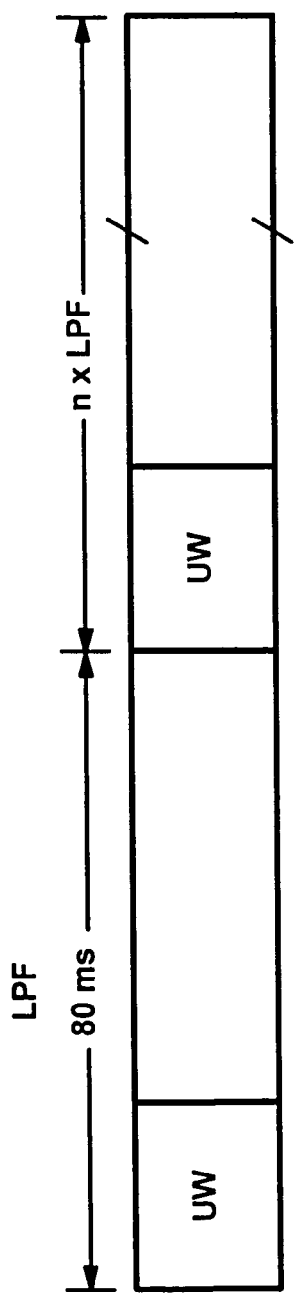
FIGS. 5a to 5d show the structure of one of the LESP channels of FIG. 4.

FIG. 5a shows the frame structure of one of the LESP channels. Each frame LPF has a duration of 80 ms and has a header consisting of a constant unique word UW which is the same for all frames. The unique word UW is used for frame acquisition, to resolve phase ambiguity of the output of the demodulator 48 and to synchronise the descrambler 56 and the decoder 54.

Figure 5B:
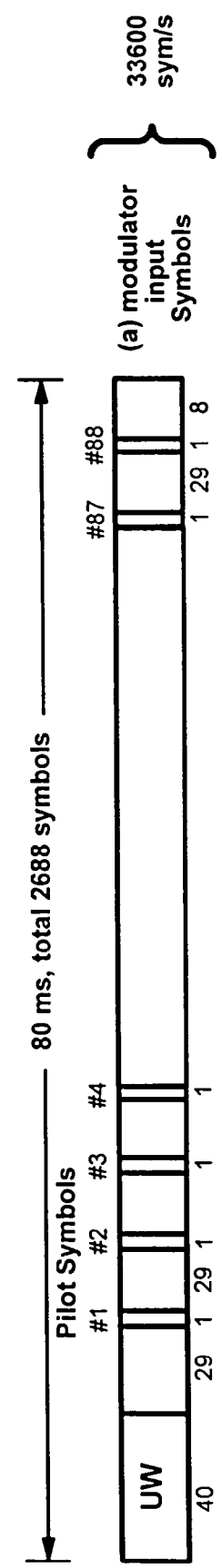
Figure 5C:
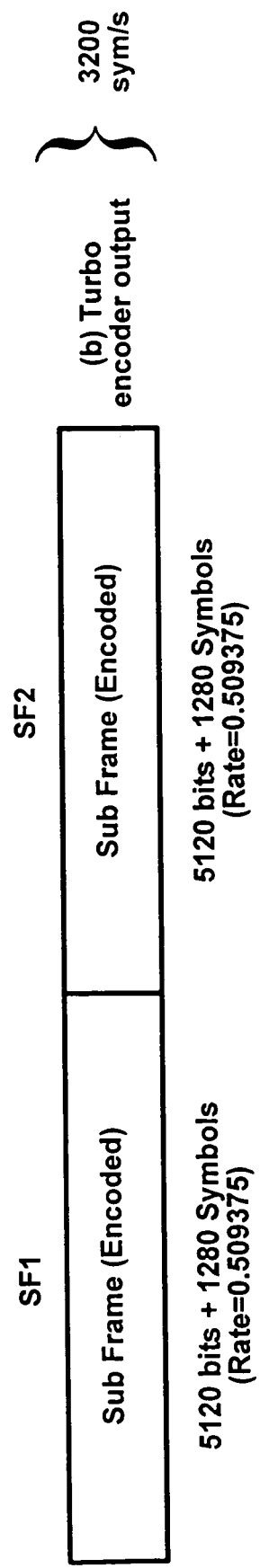
Figure 5D:
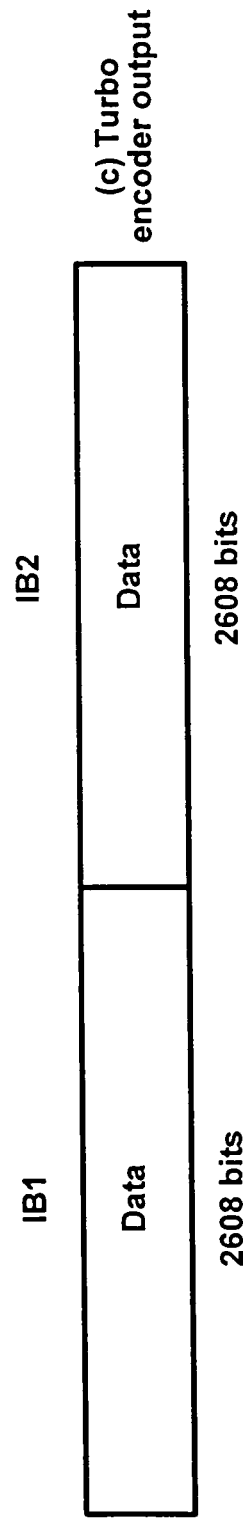

FIG. 5b shows the structure of each frame, which consists of the unique word UW of 40 symbols. followed by 88 blocks of 29 symbols each followed by a single pilot symbol PS, terminating in 8 symbols so as to make up the total frame length to 2688 symbols, of which 2560 are data symbols. These data symbols are divided, as shown in FIG. 5c, into two subframes SF1, SF2 each encoded separately by the encoder 16, each of 5120 bits, making 1280 symbols. The encoder 16 has a coding rate of 0.509375, so that each subframe is encoded from an input block IB1, IB2 of 2608 bits, as shown in FIG. 5d. This structure is summarised below in Table 1:

TABLE 1

| LESP Frame Format | |
|---|---|
| Modulation | 16QAM |
| Data Rate (kbit/s) | 65.2 |
| Interface frame length (ms) | 80 |
| Interface Frame Size (bits) | 5120 |
| Subframe length (ms) | 40 |
| Input Bits per Subframe | 2608 |
| Coding Rate | 0.509375 |
| Output Bit per Subframe | 5120 |
| Output Symbol Per Subframe | 1280 |
| Frame Length (ms) | 80 |
| Data Symbol per Frame | 2560 |
| Pilot Symbol Insertion Rate | 1/(29 + 1) |
| Pilot Symbols per Frame | 88 |
| UW symbols | 40 |
| Frame Size | 2688 |
| Symbol Rate (ksym/s) | 33.6 |

MESP Channel Format

Figure 6A:
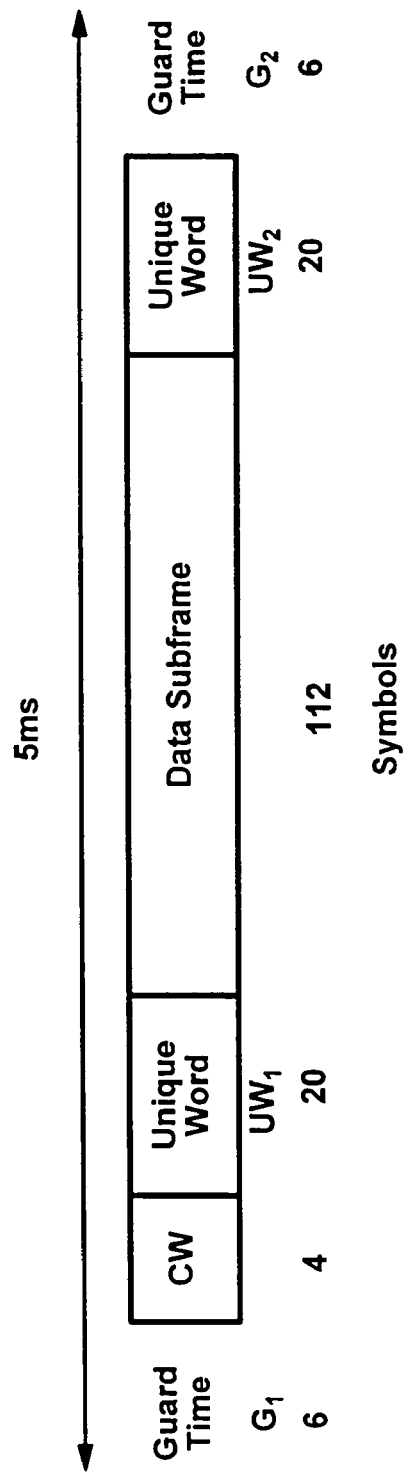
FIG. 6a shows the burst structure of a 5 ms burst in one of the MESP channels of FIG. 4.

The MESP channel structure is based on 40 ms blocks with a channel timing referenced to the timing of the associated LESP channel as received by the MAN's 2. Each 40 ms block can be divided into two 20 ms slots, each of which can be further divided into four 5 ms slots, and the division of each block into slots is determined flexibly by higher level protocols. FIG. 6a shows the format of a 5 ms burst, consisting of a pre-burst guard time G1 of 6 symbols, a preamble CW of 4 symbols, an initial unique word UW1 of 20 symbols, a data subframe of 112 symbols, a final unique word UW2 of 20 symbols and a post-burst guard time G2 of 6 symbols.

The preamble CW is not intended for synchronisation purposes by receivers (for example, the demodulators 30a, 30b)

but conveniently provides a constant power level signal to assist the automatic level control of a high-power amplifier (HPA, not shown) in the transmitting MAN 2. In one example, each of the symbols of the preamble CW has the value (0,1, 0,0). In an alternative format, the preamble may consist of less than 4 symbols and the symbol times not used by the preamble CW are added to the pre-burst and post-burst guard times G1, G2. For example, the preamble CW may be omitted altogether and the pre- and post-burst guard times increased to 8 symbols each.

The unique words include only the symbols (1,1,1,1), which is mapped onto a phase of 45° at maximum amplitude, and (0,1,0,1), which is mapped onto a phase of 225° at maximum amplitude. Hence, the unique words are effectively BPSK modulated, although the symbols are modulated by the 16QAM modulator 64. Indicating the (1,1,1,1) symbol as (1) and the (0,1,0,1) symbol as (0), the initial unique word UW1 comprises the sequence 10101100111111100100, while the final unique word UW2 comprises the sequence of symbols 10111011010110000111.

The 5 ms burst is designed for carrying short signalling messages or data messages; the structure is summarised below in Table 2:

TABLE 2

5 ms Burst Structure

| Modulation | 16QAM |
|---|---|
| Input Bits per Burst | 192 |
| Coding rate | 3/7 |
| Output Bits per Burst | 448 |
| Output Symbols per Subframe | 112 |
| Preamble | 4 |
| Initial UW (symbols) | 20 |
| Final UW (symbols) | 20 |
| Total symbols | 152 |
| Total Guard Time (symbols) | 12 |
| Symbol Rate (ksym/s) | 33.6 |
| Slot Length (ms) | 5 |

Figure 6B:
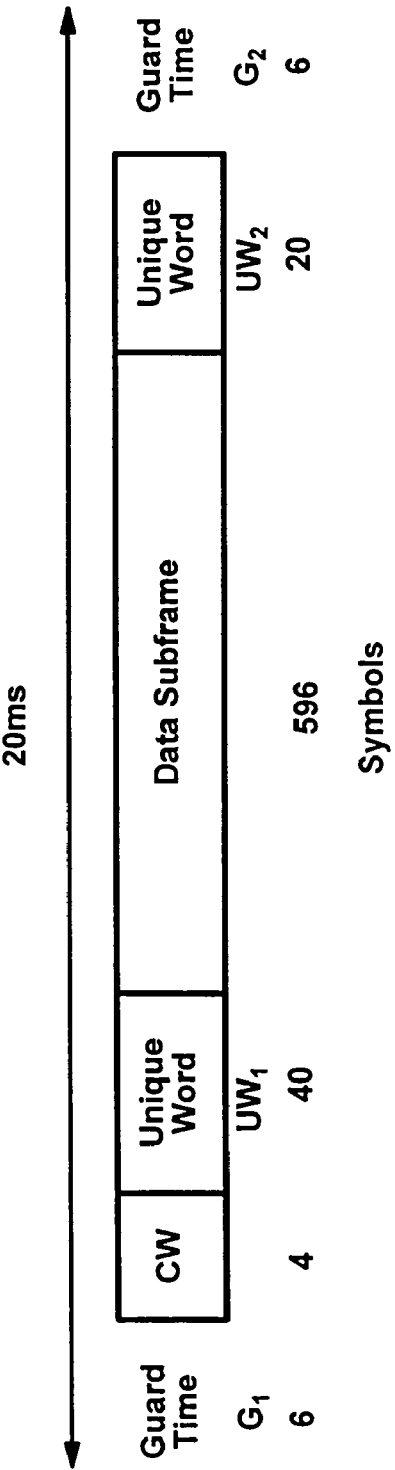
FIG. 6b shows the burst structure of a 20 ms burst in one of the MESP channels of FIG. 4.

FIG. 6b shows the structure of a 20 ms burst of the MESP channel. The same reference numerals will be used to denote the parts of the structure corresponding to those of the 5 ms burst. The structure consists of a pre-burst guard time G1 of 6 symbols, a preamble CW of 4 symbols, an initial unique word UW1 of 40 symbols, a data subframe of 596 symbols, a final unique word of 20 symbols and a post-burst guard time G2 of 6 symbols. The structure is summarised below in Table 3:

TABLE 3

20 ms Burst Structure

| Modulation | 16QAM |
|---|---|
| Input Bits per Burst | 1192 |
| Coding rate | 1/2 |
| Output Bits per Burst | 2384 |
| Output Symbols per Subframe | 596 |
| Preamble | 4 |
| Initial UW (symbols) | 40 |
| Final UW (symbols) | 20 |
| Total symbols | 660 |
| Total Guard Time (symbols) | 12 |
| Symbol Rate (ksym/s) | 33.6 |
| Slot Length (ms) | 20 |

The preamble CW has the same form and purpose as that of the 5 ms burst. The initial unique word UW1 comprises the sequence:

0000010011010100111000010001111100101101 while the final unique word UW2 comprises the sequence 1110111000001101010, using the same convention as that of the 5 ms burst.

MESP Timing Correction

As shown above, the MESP slot structure incorporates a very short guard time of about 0.24 ms at each end. However, the difference in the SAN 6 to MAN 2 propagation delay between the MAN 2 being at the sub-satellite point and at the edge of coverage is about 40 ms for a geostationary satellite, so the position of each MAN 2 will affect the timing of reception of transmitted bursts in the MESP channel, and may cause interference between bursts from MAN's 2 at different distances from the sub-satellite point. Moreover the satellite, although nominally geostationary, is subject to perturbations which introduce a small inclination to the orbit and cause the distance between the satellite 4 and the SAN 6, and between the satellite 4 and the MAN 2, to oscillate. Although the position of the SAN 6 is fixed and that of the satellite 4 can be predicted, the MAN's are mobile and therefore their positions change unpredictably, and their clocks are subject to jitter and drift.

A timing correction protocol is used by the SAN 6 to measure the propagation delay from the MAN 2 and send a timing correction value to the MAN 2 to compensate for differences in propagation delay between the different MAN's 2, so as to avoid interference between bursts from different MAN's caused by misalignment with the slots. The protocol will now be illustrated with reference to the timing diagram of FIG. 7.

FIG. 7 shows LESP frames LPF including subframes SF1, SF2 and initial unique words UW. When the MAN 2 is switched on, or is able to acquire one of the LESP channels after an interval of not being able to do so, the MAN 2 receives (step 70) a 40 ms LESP subframe SF including return schedule information which dictates the slot usage of a corresponding MESP channel. Return schedule information is transmitted periodically with a periodicity controlled by the SAN 6. The subframe SF includes the designation of a block of at least nine contiguous 5 ms slots as a timing acquisition group consisting of random access slots not assigned to any specific MAN 2. The MESP return schedule to which the subframe SF relates begins 120 ms after the beginning of reception of the subframe SF. This 120 ms period allows 90 ms for the MAN 2 to demodulate the LESP subframe SF (step 72) and 30 ms for the MAN 2 to initialise itself for transmission (step 74).

At the beginning of the MESP return schedule there is allocated a timing allocation group of 5 ms slots. Initially, it is assumed that the MAN 2 has the maximum timing uncertainty of 40 ms, corresponding to eight 5 ms slots. Therefore, the MAN 2 can only transmit after the first eight slots of the timing acquisition group, and cannot transmit at all in acquisition groups containing less than nine slots, so as to avoid interfering with transmissions in slots preceding the timing acquisition group.

The MAN 2 randomly selects (step 78) one of the slots of the timing acquisition group following the first eight slots and transmits (step 79) a burst in the selected slot, the burst including an indication of the slot selected. In the example shown in FIG. 7, the slots of the timing acquisition group are numbered from 0 to M-1, where M is the number of slots in the timing acquisition group, and the number R, selected at random from 8 to M-1, is transmitted in the burst at step 79. The burst may also indicate the type of the mobile, such as land-based, maritime or aeronautical.

The SAN 6 receives and records the time of arrival of the burst transmitted by the MAN 2. From the slot number R indicated in the burst, the SAN 6 calculates the differential propagation delay to that MAN 2. Since the timing of transmission of the burst was (120+R×5) ms after the time of reception of the LESP subframe SF, the timing of reception $T_R$ of the burst is approximately (2×DP+C+120+5×R) ms after the time of transmission of the LESP subframe LPSF, where DP is the differential propagation delay to that MAN 2 and C is a delay which is the same for all the MAN's in a group, and includes various factors such as the propagation delay to and from the satellite 4 and the retransmission delay of the satellite 4. Hence, in this example, the differential propagation delay is calculated as:

$$DP=T_R-C-120-5\times R \quad (1)$$

The SAN 6 then transmits to the MAN 2 a data packet indicating a timing correction offset X in the range 0 to 40 ms. The offset replaces the initial timing offset of 40 ms in step 76, for subsequent transmissions. The MAN 2 receives the timing correction offset and adjusts its transmission timing accordingly.

If the burst transmitted by the MAN 2 interferes with a burst transmitted by another MAN 2 also attempting to receive a timing correction, the SAN 6 may not be able to read the contents of either burst and in that case will not transmit a timing offset correction to either MAN 2. If the MAN 2 does not receive a timing offset correction from the SAN 6 within a predetermined time, the MAN 2 waits for a random interval within a predetermined range before attempting to transmit a burst in the next subsequently available timing acquisition group. The predetermined range of intervals is determined by a signalling packet transmitted by the SAN 6 which indicates maximum and minimum intervals to be observed by MAN's 2 after a first unsuccessful transmission before attempting retransmission, together with a further waiting interval to be added to the total waiting interval each time a further retransmission is made following an unsuccessful transmission.

FIG. 8*a* illustrates the transmission timing of one of the MAN's 2 which has previously received a timing correction offset value X. As in FIG. 7, the MAN 2 receives (step 80) the LESP subframe SF which includes return schedule information. The MAN 2 demodulates (step 82) the LESP subframe LPSF and initialises (step 84) its transmitting channel unit, during a total allotted time of 120 ms after the beginning of reception of the LESP subframe LPSF. The MAN 2 calculates the start of the MESP return schedule as being (120+X) ms from the beginning of reception of the subframe SF which carries the return schedule information. The MAN 2 therefore waits for the timing offset period X (step 86) after the end of the 120 ms period before being able to transmit.

In this example, the return schedule dictated by the LESP subframe LPSF includes a four 5 ms slots, followed by a 20 ms slot. If the MAN 2 has been allocated a 20 ms slot, then it will transmit (step 88) in the designated 20 ms slot; if the MAN 2 has been allocated a 5 ms slot, then it will transmit in the designated 5 ms slot. Alternatively, if the 5 ms slots are designated as being random access slots and the MAN 2 has a short packet that is due to be sent to the SAN 6, the MAN 2 selects one of the four slots at random and transmits in that slot (step 89).

If the SAN 6 detects from the transmission by the MAN 2 that a correction in the timing offset is needed, for example if the time between the start of the burst and the slot boundary as measured by the SAN 6 is less than a predetermined number of symbols, the SAN 6 indicates a new timing correction to the MAN 2 in a subsequent data packet. This may be indicated as an absolute timing offset X or as a relative timing offset to be added or subtracted from the current value of X.

Timing Uncertainty

In the timing correction offset burst the SAN 6 transmits to the MAN 2, together with the timing offset, a timing uncertainty rate $R_U$ indicating the rate at which the timing of the MAN 2 is likely to change. For example, the timing uncertainty rate may represent a number of symbols per second by which the MAN 2 is likely to change its timing. The SAN 6 determines the timing uncertainty rate from the class of the MAN 2 (e.g. land mobile, aeronautical) and other factors such as the inclination of the orbit of the satellite 6.

The MAN 2 times the interval elapsed since the last timing correction was received and multiplies this by the timing uncertainty rate $R_U$ to give a timing uncertainty $t_U$, where $$t_U=\text{MIN}(T-T_C\times R_U, 40\text{ ms}) \quad (2)$$

where T is the current time and $T_C$ is the time at which the last correction was received. The MIN function means that the timing uncertainty cannot exceed the maximum uncertainty of 40 ms.

The timing offset X is reduced by the timing uncertainty $t_U$ such that:

$$X=\text{MIN}(X_C-t_U, 0) \quad (3)$$

where $X_c$ is the initial value of X indicated in the last timing correction, the MIN function ensuring that X cannot fall below zero.

Figure 8B:
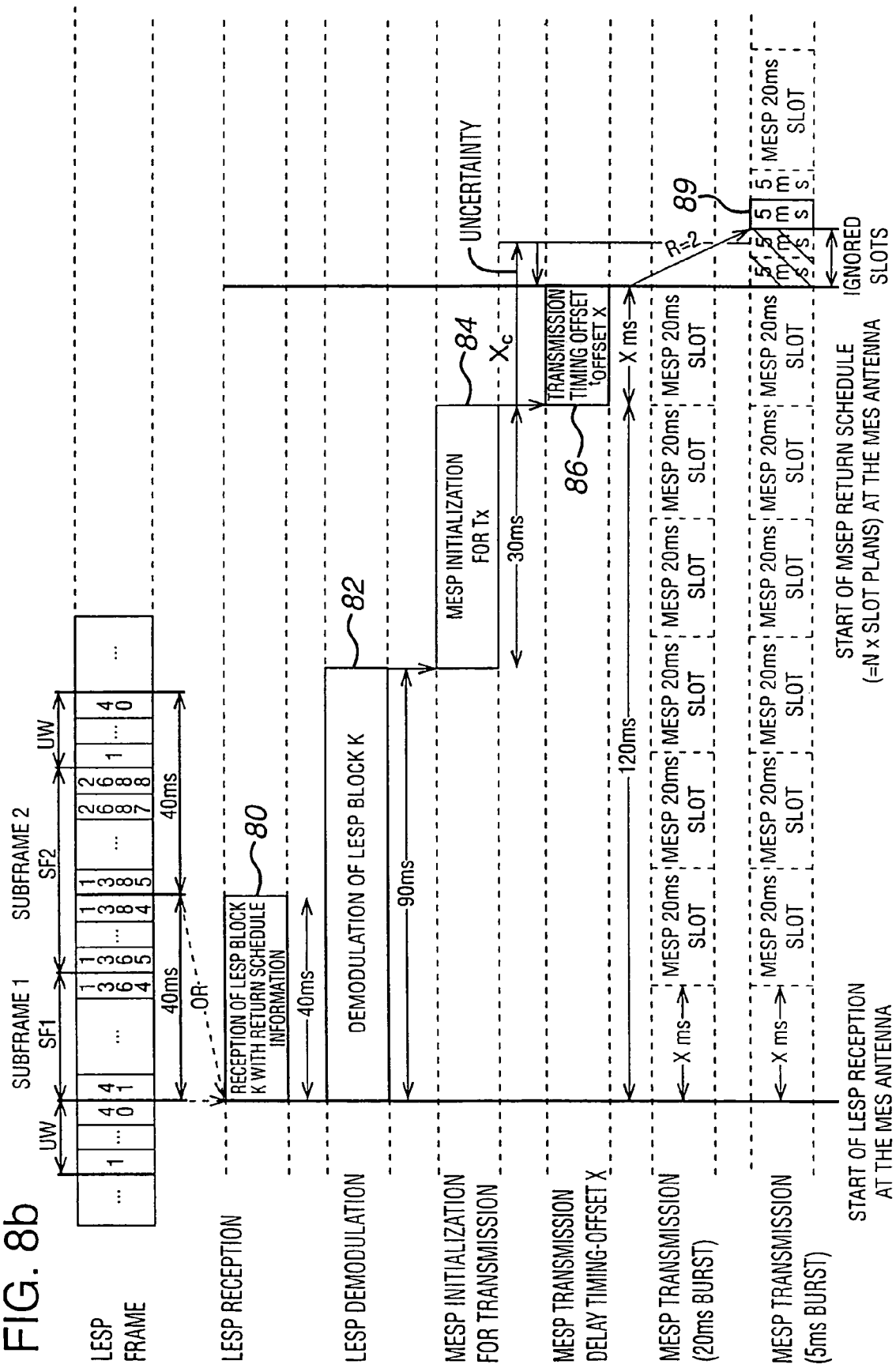
FIG. 8b is a timing diagram illustrating the timing of a transmission in one of the MESP channels at an interval after a timing correction, where there is timing uncertainty.

FIG. 8*b* illustrates the transmission timing of one of the MAN's 2 with timing uncertainty. Steps 80 to 84 correspond to those shown in FIG. 8*a* and their description will not be repeated. At step 86, the MAN 2 calculates the MESP return schedule as starting (120+X) ms after the beginning of reception of the subframe SF, using the value of X as reduced by the timing uncertainty tu. As a result of the timing uncertainty $t_U$, the MAN 2 must ignore the first I slots of a random access group, where $$I=\text{INT}[(t_S-t_G+t_U)/t_S] \quad (4)$$

$t_S$ is the slot duration of 5 ms and $t_G$ is the guard time G1, which is 6 symbol periods in this case.

In the example shown in FIG. 8*b*, there are four 5 ms slots at the start of the MESP return schedule, but tu is 7 ms, so that the first two slots must be ignored. The MAN 2 can then only transmit in the third and fourth slots.

If the timing uncertainty tu is greater than a predetermined value, such as the value of the guard time. the MAN 2 reverts to the random access timing correction request process shown in FIG. 7 and inhibits transmission in time slots allocated exclusively to itself, except where a sufficient number of these are concatenated so that their total length can accommodate both the timing uncertainty and the burst itself, until a new timing correction offset has been received from the SAN 6. However, the protocol differs from that of FIG. 7 in that the MAN 2 uses its current timing offset X instead of returning to the default value of 40 ms in step 76. This protocol reduces the chance of interference between bursts in allocated slots.

In the above embodiment, the timing offset X is reduced by the timing uncertainty $t_U$ for all transmissions by the MAN 2. In an alternative embodiment, the timing offset X is reduced by the timing uncertainty $t_U$ only for transmissions by the MAN 2 in random access slots, while the original timing offset $X_C$ received in the last timing correction message from the SAN 6 is applied when transmitting in allocated slots. In this alternative embodiment, it is important to distinguish between timing correction messages initiated by the SAN 6, after detection of a transmission by the MAN 2 in an allocated slot too close to the slot boundary, and timing correction messages sent by the SAN 6 in response to a timing correction request by the MAN 2, which will have a different timing offset from the transmissions in allocated slots. Therefore, the SAN 6 indicates in the timing correction message whether this is being sent in response to a request by the MAN 2, or was initiated by the SAN 6. The MAN 2 then determines the new timing offset $X_C$ from the timing offset indicated in the timing correction message according to how the timing correction message was initiated.

MAC Layer

Figure 9:
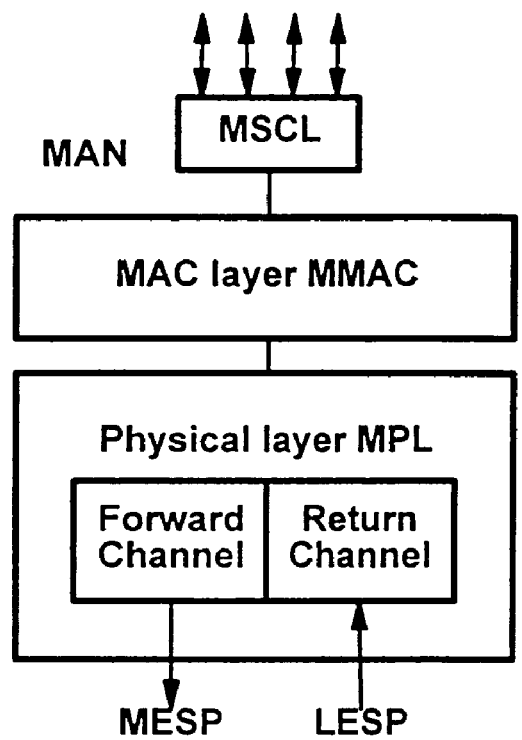
FIG. 9 is a diagram of a MAC layer in one of the MAN's.
Figure 10:
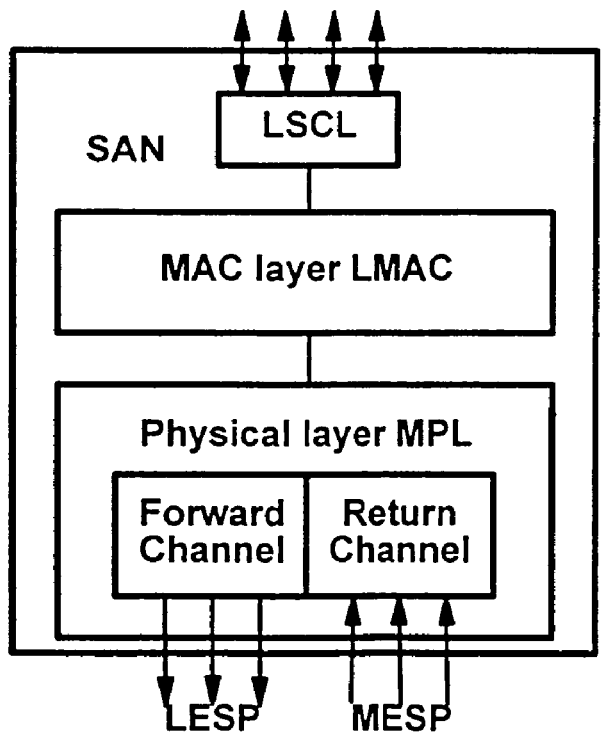
FIG. 10 is a diagram of a MAC layer in one of the SAN's.

As described above, the satellite link interface at each of the MAN's 2 and at the SAN 6 includes a medium access control (MAC) layer which provides an interface between the physical layer, aspects of which are described above, and the service connection layer, which provides access to the satellite link for one or more service connections. The MAC layer may have a structure substantially as described in UK patent application no. 9822145.0. FIG. 9 illustrates the layer structure at the MAN 2, with a physical layer MPL managing the transmission of packets on one of the MESP channels and the reception of packets on one of the LESP channels, and the MAC layer MMAC dynamically mapping service connections at the service connection layer MSCL to slots in the MESP and LESP channels. FIG. 10 illustrates the layer structure at the SAN 6, with a physical layer LPL managing the transmission of packets on multiple LESP channels and reception of packets on multiple MESP channels, and the MAC layer LMAC dynamically mapping service connections at the service connection layer LSCL to slots in the MESP and LESP channels.

The SAN MAC layer LMAC is responsible for allocating channel resources both on the LESP and on the MESP channels. The MAN MAC layer MMAC generates signalling packets indicating its current channel requirements for supporting the quality of service (QoS) requirements of all of the service connections of the service connection layer MSCL. The term 'quality of service' (QoS) includes one or more of minimum and maximum bitrate. average bitrate, and maximum delay requirements and may also include other requirements peculiar to certain types of communication. For example, where encryption is handled at the physical layer and encrypted data are transmitted on a dedicated channel, the quality of service may include an encryption requirement. The service connections may specify, both when being set up and during the lifetime of a service connection. QoS parameters without the need to specify how this QoS is to be achieved and it is the task of the MAC layer to meet the QoS requirements of all its service connections in the mapping of the service connections onto the physical layer. The MAN MAC layer MMAC requests the channel capacity necessary for this task by sending signalling packets to the SAN MAC layer LMAC.

The SAN MAC layer determines how the LESP channel slots are to be assigned to its own transmitting service connections, determines the sequence of 5 ms and 20 ms slots in each MESP channel and the allocation of these slots to the MAN's 2 or to random access, and transmits signalling packets, indicating the slot sequences and allocations, in the LESP channels. Each LESP subframe contains one-or more packets of variable length with any unused bits being filled with padding bits. The MAN MAC layer MMAC receives the packet indicating its current allocation and decides how this allocation is to be divided between its service connections.

Each MAC layer MAC receives data from service connections, formats the data into packets, and maps the data packets onto physical channels according to the current allocation scheme. Each data packet includes an identifier field identifying to which service connection the packet belongs. The receiving MAC layer receives data packets read by the physical layer and assigns the data contents to the service connections identified by the packets. The packets are of variable length depending on their type and content, and each LESP subframe or MESP 5 or 20ms burst can contain an integral number of packets, with padding if not all of the data bits are used.

Resource Management

Resource management algorithms are performed by the SAN MAC layer LMAC in order to meet the QoS requirements of each MAN MAC layer MMAC as closely as possible, as will now be described.

Periodically, the SAN 6 transmits a return schedule signalling packet on one or more of the LESP channels, indicating the allocation of slots in one of the MESP channels. The SAN MAC layer LMAC selects on which LESP channel to transmit a return schedule signalling packet according to the current allocation of MAN's 2 to the LESP channels and the MAN's which are allocated capacity in the return schedule. Thus, a return schedule signalling packet allocating MESP capacity to one of the MAN's 2 is transmitted on the LESP channel to which that MAN 2 is tuned. To minimise the number of different return schedules which need to be transmitted, the SAN MAC layer LMAC stores an association table linking a set of one or more MESP frequency channels to each of the LESP frequency channels. Where a MAN 2 is tuned to a specified LESP channel, the SAN MAC layer LMAC preferentially assigns capacity to that MAN 2 on the MESP channel or channels linked to that LESP channel. The association table is not fixed, but may be modified by the SAN MAC layer LMAC. Each MESP channel may be associated with more than one LESP channel.

The return schedule also allocates random access slots in the MESP channels linked to the LESP channel on which the return schedule is broadcast. Even if the whole of an MESP channel is allocated as random access, the return schedule indicating this will be transmitted on each of the forward bearers linked to that MESP channel.

Each MAN MAC layer MMAC sends signalling packets to the SAN MAC layer LMAC, including a queue status report indicating how much data needs to be transmitted and the time at which the data needs to be sent. The queue status report has three fields: the latest delivery time of the data packet at the head of the queue and therefore with highest priority, the latest delivery time of the data packet at the tail of the queue and therefore having the lowest priority, and the total length of data in the queue, as shown in Table 4 below:

TABLE 4

Status Packet Format

| | Bits | | | | | | | |
|---|---|---|---|---|---|---|---|---|
| | 8 | 7 | 6 | 5 | 4 | 3 | 2 | 1 |
| Octet 1 | x | 0 | 0 | 0 | 1 | 1 | 0 | 0 |
| Octet 2 | | <SeqNum> | | | U | < | | |
| Octet 3 | | | | | | | Queue Length> | |
| Octet 4 | <Time Head | | | | | | | |
| Octet 5 | | | | | > < | | | |
| Octet 6 | | | | | | | Time Tail> | | where the fields are defined as follows:

SeqNum: Identifies the sequence number of the status packet, so that the SAN 6 can identify the sequence order of different status packets from the same MAN 2;

U: Small units flag, which identifies whether the subsequent queue length is expressed in large or small units of data; the large units may be equal to the capacity of a 20 ms slot;

Queue Length: the length of the data queue at the MAN2, expressed in large or small units according to the small units flag;

Time-Head: the delivery time, as an offset from the time of transmission of the queue status report, of the first packet in the data queue; and Time-Tail: the delivery time, as an offset from the time of transmission of the queue status report, of the last packet in the data queue.

This format is particularly efficient in that it avoids transmitting the transmission time requirements of each of the data packets, which would require too great a signalling overhead, while providing the SAN MAC layer LMAC with enough information to decide how much capacity, and when, to allocate to the requesting MAN 2.

However, the queue status reports still take up significant bandwidth on the MESP channels which may be required to transmit data packets at times of high loading. Moreover, the MAN MAC layer MMAC may transmit queue status information in a contention based slot if no reserved capacity is available, increasing the probability of collision in the contention based slots. To reduce the contention slot loading, and therefore to allow some of this bandwidth to be reclaimed for data packet allocation, the SAN 6 may transmit reporting level control signalling packets addressed to all the MAN's 2. The control signalling packets may indicate the minimum delay required before queue status should be reported in a contention slot, and also a reporting control parameter which determines whether the MAN's 2 will transmit queue status information as soon as possible (subject to the minimum delay), as late as possible, or at a specified point between these two extremes. The latest possible delay is determined from the QoS delay requirements and the round trip (MAN-SAN-MAN) delay and allows for only a minimum time for the SAN 6 to allocate the return capacity on receipt of the queue status information. Each MAN MAC layer MMAC, on receiving a reporting level control signalling packet, applies the parameters indicated therein. In cases where the QoS demands of the service connections to a MAN 2 increase very quickly, a long minimum reporting interval and/or a high reporting control parameter may delay the MAN MAC layer's requests for capacity so that the SAN 6 is unable to meet the required delay times indicated for all the MAN's within the QoS delay requirements. A short minimum reporting interval and/or a low reporting control parameter will increase the probability of the MAN MAC layer requests reaching the SAN 6 in time for the required capacity to be allocated but will increase the number of contention slots required. The SAN 6 may determine the appropriate parameters for the mix of traffic being carried.

The SAN MAC layer LMAC periodically allocates a contiguous block of at least nine 5 ms slots as a timing acquisition group and transmits a signalling packet indicating this allocation. The length and frequency of timing acquisition groups is allocated by the SAN MAC layer LMAC according to anticipated demand (which may be determined by detected timing acquisition group loading), subject to a predetermined maximum interval between timing acquisition groups, to allow efficient operation of the timing acquisition protocol.

The SAN MAC layer LMAC also determines the minimum and maximum randomising intervals and further interval by which the MAN's 2 wait, as described above, before retransmitting a timing acquisition burst following an unsuccessful timing acquisition. These intervals determine the timing spread of timing acquisition burst retransmissions and are selected so as to keep the probability of collision between retransmissions low, without causing excessive delay to the MAN's 2 performing timing acquisition.

The SAN MAC layer LMAC also monitors the traffic transmitted on the LESP channels in order to predict the future transmission capacity needs of each of the MAN's 2. For example, for each service connection which is operating in ARQ mode, resources are allocated to the MAN 2 through which the connection is operating when an ARQ time-out period is about to expire. Service-specific resource prediction may also be performed. For example, if the SAN MAC layer LMAC detects that a packet transmitted to a MAN 2 contains a request for transmission of a block of data, the capacity necessary to transmit that block of data is allocated to the MAN 2 without waiting for the MAN 2 to request the additional capacity. However, it may not be possible to interpret the data contents of packets, for example if the contents are already encrypted or the type of application is unknown to the SAN MAC layer LMAC. Moreover, the interpretation of user data by communications interfaces may not be acceptable to users. Therefore, additionally or alternatively a statistical model may be stored at the SAN 6 and used to predict demand by the MAN's 2; optionally, the statistical model may be modified by monitoring the traffic flow on individual duplex connections over the LESP and MESP channels and deducing statistical patterns. For example, it may be detected that a sequence of short data packets with a constant length and interval transmitted to a service connection on the MAN 2 is usually followed by a high flow of data transmitted by the MAN 2 from that service connection. The statistical model is then updated so that, every time the same sequence of data packets is subsequently detected, additional capacity is allocated to the MAN 2 in the from-mobile direction, if available. This reverse data flow prediction reduces the amount of queue status signalling that need to be transmitted by the MAN 2.

The above embodiments have been described with reference to certain Inmarsat™ systems purely by way of example and aspects of the present invention are not limited thereto. Instead, aspects of the present invention may be applied to terrestrial wireless networks, particularly those that support contention-based access. The above embodiments are illustrated with reference to an architecture in which multiple mobile terminals access a network via a single access point (the SAN) via a satellite which acts only as a repeater. However, aspects of the present invention are also applicable to satellite networks in which one or more satellites perform resource management and/or formatting functions. Furthermore, it is not essential that the mobile terminals receive resource allocation signals from the same node with which the allocated resources are used to communicate.

While the apparatus of the specific embodiments has been described in terms of functional blocks, these blocks do not necessarily correspond to discrete hardware or software objects. As is well known, most baseband functions may in practice be performed by suitably programmed DSP's or general purpose processors and the software may be optimised for speed rather than structure.

The invention claimed is:

1. A method of allocating frequency channels to a plurality of wireless transceivers, comprising:

transmitting to each of said plurality of transceivers a forward frequency channel allocation signal indicating an allocation of a forward frequency channel which that transceiver is to receive, wherein each transceiver in said plurality of transceivers is allocated a different forward frequency channel; and transmitting to each of said plurality of transceivers, in said forward frequency channel assigned to that transceiver, a respective return channel allocation signal indicating an allocation of one or more return frequency channels in which that transceiver may transmit;

wherein, for each forward frequency channel, a set of preferred return frequency channels is stored, such that for said transceiver to which a specified one of said forward frequency channel is allocated, the allocated one or more return frequency channels is preferentially selected from said corresponding set of preferred return frequency channels.

2. A method of controlling transmission by a wireless first transceiver in a channel shared with transmission by other transceivers, comprising:

monitoring data packets transmitted to said first transceiver;

analyzing the content of the payload of said monitored data packets;

predicting, on the basis of said analyzing, a future demand for capacity in said channel by said first transceiver; and transmitting to said first transceiver an allocation signal indicating an allocation in said channel determined according to said predicted demand, wherein said allocation is made independently from a request for allocation by said first transceiver.

3. A method as claimed in claim 2, including detecting the content of said monitored data, wherein the demand for capacity is predicted according to said content.

4. A method as claimed in claim 2, including generating a statistical model based on previous traffic flow to and from wireless transceivers, wherein the demand for capacity is predicted according to said statistical model.

* * * * *